Oct. 20, 1964  H. R. McPHERSON  3,153,469
PARKING METER
Filed Sept. 18, 1961
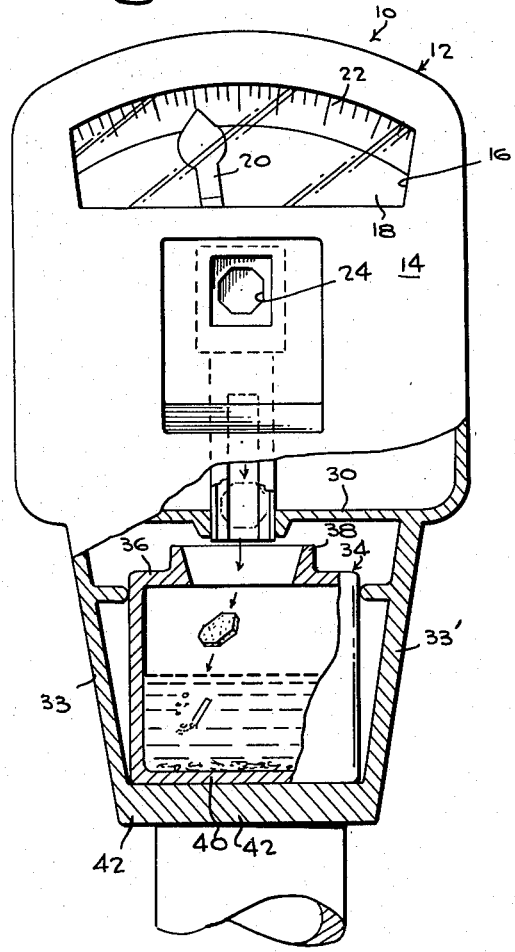
Fig-1
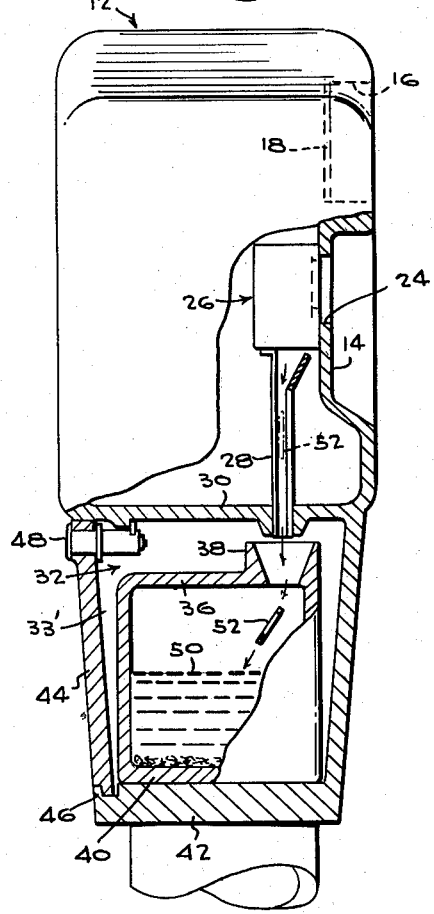
Fig-2
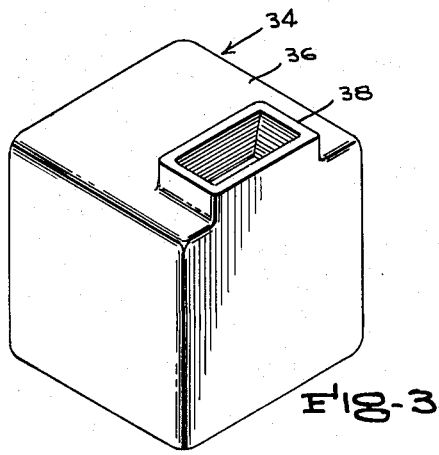
Fig-3
 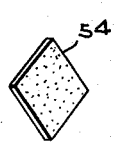 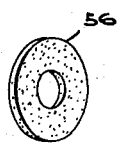
Fig-4  Fig-5  Fig-6
INVENTOR.
HECTOR R. McPHERSON
BY
McMorrow, Berman & Davidson
ATTORNEYS

United States Patent Office 3,153,469
Patented Oct. 20, 1964

3,153,469
PARKING METER
Hector R. McPherson, 2170 Cornwall St., Vancouver,
British Columbia, Canada
Filed Aug. 18, 1961, Ser. No. 132,491
3 Claims. (Cl. 194—4)

This invention relates to the general field of coin or token operated devices and, more specifically, the invention pertains to a parking meter.

It is a well-known fact that the conventional coin-operated parking meters are attractive to both juveniles and adults as providing a source of a limited amount of ready cash. Thefts from the cash boxes of such meters are not an uncommon occurrence, and for the most part, the cash boxes may be easily robbed by a seriously-minded person, without the recourse of a key. Naturally, the thefts of these small amounts of cash are not materially impressive when considering the individual robbery of a single cash box, but the total thereof, when considered on a national scale, is surprisingly high.

It is, therefore, one of the primary objects of this invention to provide a token-operated metering device with means rendering the same unsuited for robbery purposes.

Another object of this invention is to provide a token-operated metering device in which means are provided for rendering the token non-reusable.

A further object of this invention is to provide a token-operated meter wherein, after the meter has been activated, means are provided for destroying the token.

This invention contemplates, as a still further object thereof, the provision of a token-operated meter of the type generally described above, the meter being non-expensive to manufacture and maintain, non-complex in construction and assembly, and which is durable in use.

Further objects and advantages of the instant invention will become more manifest from a consideration of the following specification when read in conjunction with the annexed drawing, in which:

FIGURE 1 is a front elevational view of a token-operated parking meter, the view taken partly broken away to illustrate the invention;

FIGURE 2 is a side elevational view, FIGURE 2 also being partially broken away to illustrate the invention;

FIGURE 3 is a perspective view of the container for the dissolving agent; and

FIGURES 4, 5 and 6 illustrate the configurations of several dissolvable tokens.

Referring now more specifically to the drawing, reference numeral 10 designates, in general, the conventional token-operated parking meter. As such, the meter 10 includes a substantially hollow, vertically-elongated, rectangular casing 12 having a front wall 14. The front wall 14 is formed with the usual opening 16 in which is set a transparent pane 18. Behind the window 18 is located the usual indicating pointer 20 which is adapted to swing across the usual metering scale 22. Details of the indicating pointer operating means have not been shown, since the same form no part of the instant invention.

As in the conventional parking meters, meter 10 includes a token-receiving slot 24 which extends transversely through the front wall 14 substantially centrally of the meter 10. The token, when inserted through the slot 24, falls rearwardly into the needle-actuating means 26, tripping the same and causing the pointer 20 to move across the scale 22. The token-actuating means has subtended therefrom a token chute 28 which receives the inserted token, the token chute 28 extending downwardly and transversely through the bottom wall 30, and at its lower end the token chute 28 is in open communication with a substantially hollow rectangular compartment 32.

Reference numeral 34 designates, in general, a substantially hollow, rectangular container having a top wall 36 from one end of which projects an upwardly-extending spout 38. The container 34 is adapted to be inserted within the compartment 32 with the bottom wall 40 of the container 34 resting upon the lower closure wall 42 of the housing 12. When the container 34 is properly positioned within the compartment 32, the spout 38 is aligned with the open lower end of the token chute 28. The compartment 32 is formed with a removable back access panel 44 held in closed position by means of the tongue-and-groove connection 46 and a manually-operable lock 48. The compartment 32 is defined by the bottom wall 30, the front wall 14, the side walls 33, 33', the lower closure wall 42, and the back access panel 44.

Prior to the insertion of the container 34 into the compartment 32, a dissolving agent 50 is passed through the spout 38 to substantially fill the container 34.

FIGURES 4, 5 and 6 all illustrate embodiments of tokens constructed in accordance with this embodiment. The tokens shown in FIGURES 4, 5 and 6 are all formed of a material which will easily dissolve in the dissolving agent 50. The tokens may be hexagonal, as indicated by reference numberal 52, rectangular, as shown at 54, or annular, as shown at 56. The particular sizes and shapes of these tokens may vary at the will of the manufacturer of the metering devices 10. As illustrated herein, the token 52, shown in FIGURE 4, is designed to be accepted through the token slot 24.

Assuming that the token 52 has been inserted through the slot 24, the same falls downwardly into the token chute 28 from which it falls, passing, in turn, through the spout 38 and into the container 34 and drops into the dissolving agent 50.

Obviously, since the token 52 dissolves in the agent 50, nothing remains which would of value to a person tempted to break into the meter 10.

The tokens 52, 54, 56 could be made available for distribution to motorists through approved service stations in packets (not shown) of ten or twenty. These would be supplied to the service stations by the municipal authorities.

While the instant invention has been disclosed in conjunction with a parking meter, its application may be considered widespread. For example, public telephones could be easily equipped with this invention to prevent their well-known losses. Cigarette vending machines, beverage vending devices, and, in fact, practically any similar machine operated by the public could be guarded against theft through the use of this invention.

The tokens may be made of any suitable materials, but it is preferred to make the same of a plastic. Examples of the plastics and their solvents are as follows:

| Plastics: | Solvents |
|---|---|
| Polyethylene Cellulose Nitrate | Dipropylene glycol |
| Vinyl Butyral | Sec-undecylalcohol |
| Vinyl Chloride Acetate | Di-isobutyl ketone |
| Vinyl Acetate | Cyclohexanol |
| Polymethyl Methacrylate | { Methyl formate <br> { Ethyl formate |
| Polystyrene | Chlorothene |
| Ethylcellulose | Sec-amyl alcohol |
| Cellulose | Diethylene glycol |
| Cellulose Acetate | Furfuryl alcohol |
| Cellulose Acetate | |
| Cellulose Acetate-butyrate | { Acetonitrile |
| Cellulose Nitrate | |
| Vinyl Acetate | |

These plastics and their associated solvents have been found very suitable to serve their intended functions.

Having described and illustrated one embodiment of

What is claimed is:

1. A token-actuated device having a housing including a front wall, a pair of opposed side walls, a bottom wall, and a lower closure wall, said side, front, bottom and lower closure walls forming a token-receiving compartment, said front wall having a token-receiving slot extending transversely therethrough about said compartment, device-actuating means connected with said front wall to receive a token from said slot, a token chute having a pair of opposed open ends, said chute having one of said ends connected with said actuating means to receive tokens therefrom, the other end of said chute extending through said bottom wall and being in open communication with said said compartment, a container disposed in said compartment, said container having an opening therein in registry with said other end of said chute, and a solvent disposed in said container to dissolve said tokens received in said container.

2. A plastic token-actuated device having a housing including a front wall, a pair of opposed side walls, a bottom wall and a lower closure wall, said top, side, bottom and closure walls defining a substantially hollow rectangular compartment, said front wall extending beyond said bottom wall and having a token slot formed therein, device-actuating means juxtaposed relative to said slot to receive tokens therefrom, an elongated token chute having opposed open ends, means connecting one end of said chute to said means to receive tokens therefrom, the other end of said chute extending through said bottom wall and opening into said compartment, a container disposed in said compartment, said container being supported on said closure wall and having on opening formed therein confronting said other end of said token chute to receive said tokens therethrough, and a solvent in said container to dissolve said tokens as they are received in said container.

3. A plastic token-operable parking meter comprising a housing having a front wall, a pair of opposed side walls, a bottom wall, and a lower closure wall, said front, side, bottom and closure walls forming a substantially hollow rectangular compartment, said front wall having a window formed therein, a scale disposed within said housing and viewable through said window, an indicating needle pivotally mounted on said housing for pivotal movement across said scale, said front wall having a token slot extending transversely therethrough, token-actuated means juxtaposed relative to said slot to receive tokens therethrough, said needle being connected with said means to effect pivotal movement thereof, an elongated token chute having a pair of opposed open ends, said chute having one of its ends connected to said actuating device to receive tokens therefrom, the other end of said chute extending through said bottom wall and opening into said compartment, a container disposed in said compartment and having an opening formed therein confronting said other end of said chute and being supported on said lower closure wall, and a solvent disposed in said container to dissolve said tokens as they are received in said container.

References Cited in the file of this patent

UNITED STATES PATENTS

| | | |
|---|---|---|
| 2,070,445 | Miller | Feb. 9, 1937 |
| 2,073,904 | Osteen | Mar. 16, 1937 |
| 2,253,311 | Ward | Aug. 19, 1941 |
| 2,312,639 | Gronemeyer | Mar. 2, 1943 |
| 2,898,198 | Robedee | Aug. 4, 1959 |

FOREIGN PATENTS

| | | |
|---|---|---|
| 763,719 | Great Britain | Dec. 12, 1956 |